United States Patent [19]
Kahle et al.

[11] Patent Number: 5,758,140
[45] Date of Patent: May 26, 1998

[54] METHOD AND SYSTEM FOR EMULATING INSTRUCTIONS BY PERFORMING AN OPERATION DIRECTLY USING SPECIAL-PURPOSE REGISTER CONTENTS

[75] Inventors: James Allan Kahle; Soummya Mallick, both of Austin, Tex.

[73] Assignee: International Business Machines Corporation, Armonk, N.Y.

[21] Appl. No.: 581,793

[22] Filed: Jan. 25, 1996

[51] Int. Cl.⁶ ........................................... G06F 9/42
[52] U.S. Cl. ..................... 395/568; 395/376; 395/500
[58] Field of Search ................... 395/500, 568, 395/376

[56] References Cited

U.S. PATENT DOCUMENTS

| | | |
|---|---|---|
| 3,891,974 | 6/1975 | Coulter et al. |
| 3,997,895 | 12/1976 | Cassonnet et al. |
| 4,077,058 | 2/1978 | Appell et al. |
| 4,084,235 | 4/1978 | Hirtle et al. |
| 4,587,612 | 5/1986 | Fisk et al. |
| 4,841,476 | 6/1989 | Mitchell et al. |
| 5,077,657 | 12/1991 | Cooper et al. ............... 395/500 |
| 5,574,873 | 11/1996 | Davidian ...................... 395/376 |
| 5,623,617 | 4/1997 | Davidian ...................... 395/568 |

FOREIGN PATENT DOCUMENTS

| | | |
|---|---|---|
| 0264215 | 10/1987 | European Pat. Off. |
| 4232053 | 11/1993 | Germany . |
| 62-25334 | 2/1987 | Japan . |
| 63-106836 | 5/1988 | Japan . |
| 2236734 | 9/1990 | Japan . |
| 5181671 | 7/1993 | Japan . |
| 9427215 | 11/1994 | WIPO . |

OTHER PUBLICATIONS

IBM Technical Disclosure Bulletin, vol. 37, No. 3, Mar. 1994, p. 605, "Real–Time CISC Architecture HW Emulator On A RISC Processor".
IBM Technical Disclosure Bulletin, vol. 36, No. 2, Feb. 1993, p. 233, "High Performance Dual Architecture Processor".
IBM Technical Disclosure Bulletin vol. 28 No. 1, Jun. 1985; pp. 305–306.
IBM Technical Disclosure Bulletin vol. 29 No. 2, Jul. 1986; pp. 548–549.
IBM Technical Disclosure Bulletin vol. 31 No. 1, Jun. 1988; pp. 465–472.
IBM Technical Disclosure Bulletin vol. 31 No. 3, Aug. 1988; pp. 4–9.
IBM Technical Disclosure Bulletin vol. 32 No. 11, Apr. 1990; pp. 135–136.
IBM Technical Disclosure Bulletin vol. 36 No. 2, Feb. 1993; pp. 231–234.

*Primary Examiner*—Krisna Lim
*Attorney, Agent, or Firm*—Sawyer & Associates; Mark E. McBurney

[57] ABSTRACT

A system and method for improving the performance of a processor that emulates a guest instruction where the guest instruction includes a first and second operand. The first operand is stored in a general purpose register, and the second operand is stored in a special-purpose register. The method and system provides a host instruction that performs an operation using the first operand and the second operand without moving the second operand from the special-purpose register into the general purpose register. This reduces the number of instructions in the semantic routines necessary to operate on immediate data from guest instructions and increases emulation performance.

18 Claims, 5 Drawing Sheets

| | |
|---|---|
| MFGI | RT |
| ADDFGI | RT,RA |
| SUBFGI | RT,RA |
| SHIFTFGI | RT,RA |

FIG. 5

METHOD AND SYSTEM FOR EMULATING INSTRUCTIONS BY PERFORMING AN OPERATION DIRECTLY USING SPECIAL-PURPOSE REGISTER CONTENTS

FIELD OF THE INVENTION

The present invention relates to a method and system for emulating guest instructions in a host processor, and more particularly to a method and system for improving emulation performance by providing instructions that operate on special-purpose register contents.

BACKGROUND OF THE INVENTION

There are two methods for emulating in software a guest instruction set, such as the Intel x86 instruction set, on a host processor, such as the Motorola PowerPC™. The first method is known as interpretation, which uses an interpreter, and the second as dynamic translation, which uses a dynamic translator. Interpreters mimic the fetch, decode, and execute cycles performed by hardware in traditional host processors. Dynamic translators fetch and decode a block of guest instructions and translate them into host instructions, which are then reused. Each method has strengths and weaknesses.

Interpreters typically use less memory, but perform slower than dynamic translators. Dynamic translators perform well when the guest program include parts that are frequently reused. But dynamic translators perform poorly when the guest program modifies parts that had previously been translated.

The assignee of the present application has developed hardware that assists software emulation methods in order to obtain a solution that has the positive characteristics of both methods: the small size of the interpreter and the speed of execution of the dynamic translator. Before the assisting hardware is used, the sequence of host instructions necessary to perform the function of each guest instruction are compiled into separate functions, called semantic routines, and stored in memory. The hardware works in conjunction with software to fetch guest instructions, decode them, and dispatch the corresponding semantic routine in the host processor.

Some guest instructions perform an operation on one or more source operands, and store the result in a destination operand. Typically, the first operand in a two-operand instruction is either the contents of a register or a memory location; the second operand is usually either the contents of a register or immediate data, which is a numeric constant.

When emulating a guest instruction, the hardware assist unit typically stores the source operands from a guest instruction in one or more general purpose registers (GPRs) within the host processor. Source operands that are immediate data, however, are typically stored in special-purpose registers (SPRs) within the hardware assist unit.

When guest instruction performs an operation, such as an add, on a source operand and immediate data, the source operand in the GPR must be added to the immediate data in the SPR. This addition, however, is typically performed by an integer unit in the host processor that is only capable of adding the contents of GPRs. Semantic routines that perform operations on the contents of an SPR must therefore include an extra host instruction that moves the contents of an SPR into a GPR. The integer unit is then able to add the operand in the first GPR with the immediate data in the second GPR. The disadvantage of this method is that the execution of the extra move instructions within the semantic routines can significantly slow the emulation performance of the processor.

Accordingly, what is needed therefore is a method and system for improving emulation performance using instructions that operate on special-purpose register contents. The present invention addresses such a need.

SUMMARY OF THE INVENTION

The present invention provides a method and system for improving the performance of a processor that emulates a guest instruction where the guest instruction includes a first and second operand. The first operand is stored in a general purpose register, and the second operand is stored in a special-purpose register. The method and system provides a host instruction that performs an operation using the first operand and the second operand without moving the second operand from the special-purpose register into the general purpose register.

According to the system and method disclosed herein, the present invention reduces the number of instructions in semantic routines that operate on immediate data, thereby decreasing the execution time of the semantic routines and increasing emulation performance.

BRIEF DESCRIPTION OF THE DRAWINGS

FIG. 5 is a table listing a set of host instructions that operate on immediate data that is stored in an special-purpose register.

DESCRIPTION OF THE INVENTION

The present invention relates to an improvement in emulating guest instructions in a host processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
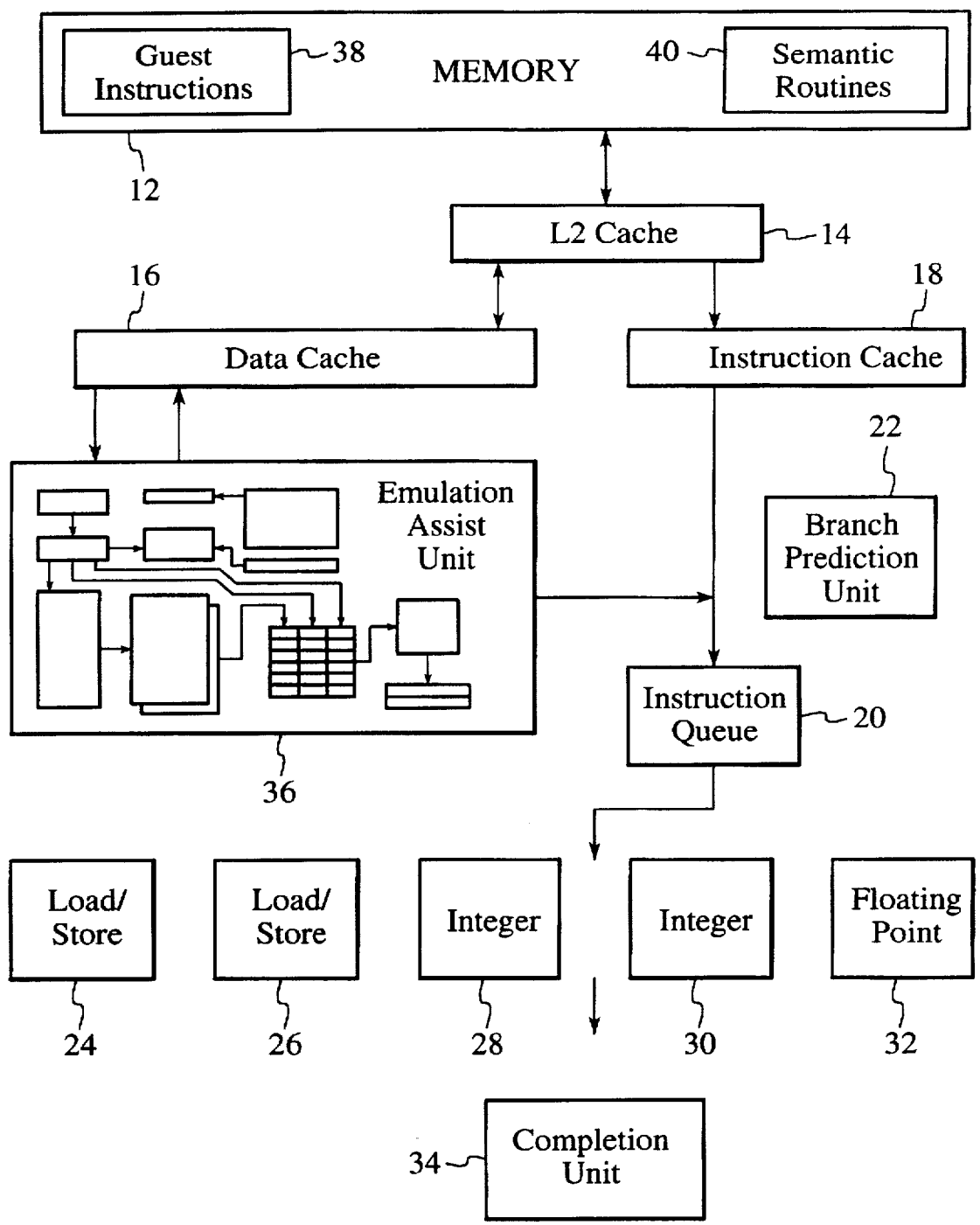
FIG. 1 is a block diagram depicting a high-level architecture of a host processor.

FIG. 1 is a block diagram depicting a high-level architecture of a host processor 10. Typically, the processor 10 executes native software instructions using various hardware components, such as a memory 12, a level 2 (L2) cache 14, a data cache 16, an instruction cache (IC) 18, an instruction queue (IQ) 20, a branch prediction unit 22, functional units 24–32, and a completion buffer 34.

In a preferred embodiment of the present invention, the processor 10 is a PowerPC manufactured by Motorola that executes a PowerPC (PPC) instruction set. Besides executing the PPC instruction set, the processor 10 is also capable of emulating a plurality of guest instructions 38, such as Intel x86 instructions and Motorola 68K Complex Instruction Set Computers (CISC) instructions.

The component responsible for assisting the processor 10 in emulating guest instructions 38 is an emulation assist unit (EAU) 36. To enable the processor 10 to emulate the guest instructions 38, each guest instruction 38 is first translated into a corresponding set of host instructions, called a semantic routine 40, that perform the function of guest instruction 38 in the host processor 10. Each semantic routine 40 is stored at a specific address location in the memory 12. The guest instructions 38 (and data) are also stored in the memory 12.

In operation, the processor 10 caches the guest instructions 38 and data into the L2 cache 14 and the data cache 16, respectively. The EAU 36 fetches and decodes the guest instructions 38, and then maps each of the guest instructions 38 into the host memory address of the corresponding semantic routine 40. The processor 10 fetches the semantic routine 40 located at the specified memory address into the instruction cache 18. The host instructions contained in the semantic routine 40 are then transferred to the IQ 20. Each host instruction is then decoded and executed using the branch prediction unit 22 and the functional units 24–32. After the semantic routine 40 is executed and the results stored in the completion buffer 34, the EAU 36 maps the host address of the next guest instruction 38, and the process repeats.

Figure 2:
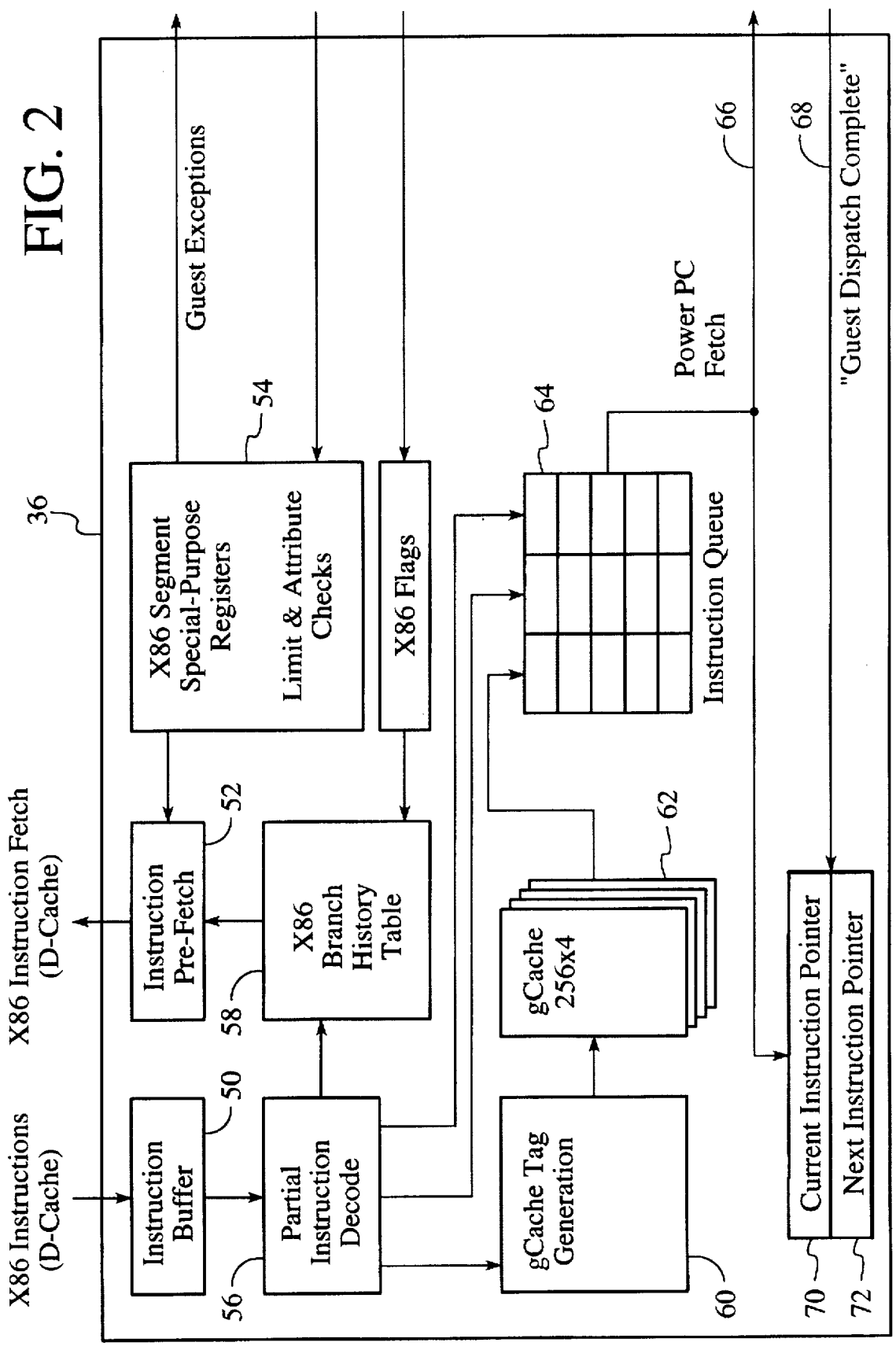
FIG. 2 is a block diagram of an emulation assist unit.

Referring now to FIG. 2, a block diagram of the EAU 36 is shown. The EAU 36 includes an instruction buffer 50, a pre-fetch unit 52, special-purpose registers (SPRs) 54, a decode unit 56, a branch history table 58, a tag generation unit 60, a guest cache (gcache) 62, and a gcache instruction queue 64. The function of the EAU 36 is assist the processor 10 in emulating guest instructions 38 using a direct mapping scheme.

A guest instruction 38 is first pre-fetched by the pre-fetch unit 52 from the data cache 16. The guest instruction 38 is then loaded into the instruction buffer 50 and transferred to the decode unit 56. Since a direct mapping of a guest instruction 38 to a host address is complicated by its syntax, the decode unit 56 is used to parse or decode a guest instruction 38 to determine length, branch type, and immediate data. If the instruction 38 is a branch, the branch history table 58 is used to predict the next pre-fetch address.

The gcache 62 is an array that includes an entry for each semantic routine 40 and its corresponding host memory address. After the guest instruction 38 is decoded, the tag generation unit 60 converts the instruction 38 into a unique opcode tag, and the opcode tag is used as an index to the gcache 62 to access the corresponding semantic routine 40 address.

As guest instructions 38 are decoded and the corresponding semantic routines 40 become known, the semantic routines 40 and their addresses are stored in the gcache instruction queue 64. Each entry in the gcache instruction queue 64 include an offset field and a data field. The offset field is a pointer to the host (PowerPC (PPC)) address of the semantic routines 40. The data field includes the immediate data from the guest instruction that the semantic routine 40 is to process. In a preferred embodiment of the present invention, the offset field and the data field containing the immediate data are stored in the SPRs 54.

Referring to both FIGS. 1 and 2, the processor 10 fetches the first entry in the instruction queue 64 via line 66, and retrieves the appropriate semantic routine 40 from memory 12 for execution. The last instruction in each semantic routine 40 is a branch instruction, which in a preferred embodiment, is a guest dispatch complete (gdisc) instruction 68. When the processor 10 fetches and decodes a gdisc instruction 68, it causes the processor 10 to fetch, via line 68, the address of the next semantic routine 40 from the instruction queue 64.

In a preferred embodiment, the address of the next semantic routine 40 to be executed is stored in the current instruction pointer (IP) 70. The decode of the gdisc instruction 68 also causes the next IP 72 to be moved into the current IP 72. Also in a preferred embodiment, the gdisc instruction is an unconditional branch instruction, but any instruction that causes the processor to fetch the next semantic routine may be used.

Typically, there are several different functional types of guest instructions, such as data transfer, arithmetic, and logic instructions. These types of instructions specify whether the instruction is to perform an operation upon immediate data, register or memory locations. As an example, a sample guest instruction may have the following format:

ADD G1, '4 where the "ADD" instruction adds the contents of the GPR with the immediate value of four. Referring again to FIG. 2, the sample guest instruction 38 is emulated in the processor 10 using the semantic routine 40 corresponding to the guest "ADD" instruction. Once this semantic routine 40 is dispatched, it is executed by one of the integer units 28 and 30. For purposes of this discussion, integer units 28 and 30 are identical.

Figure 3:
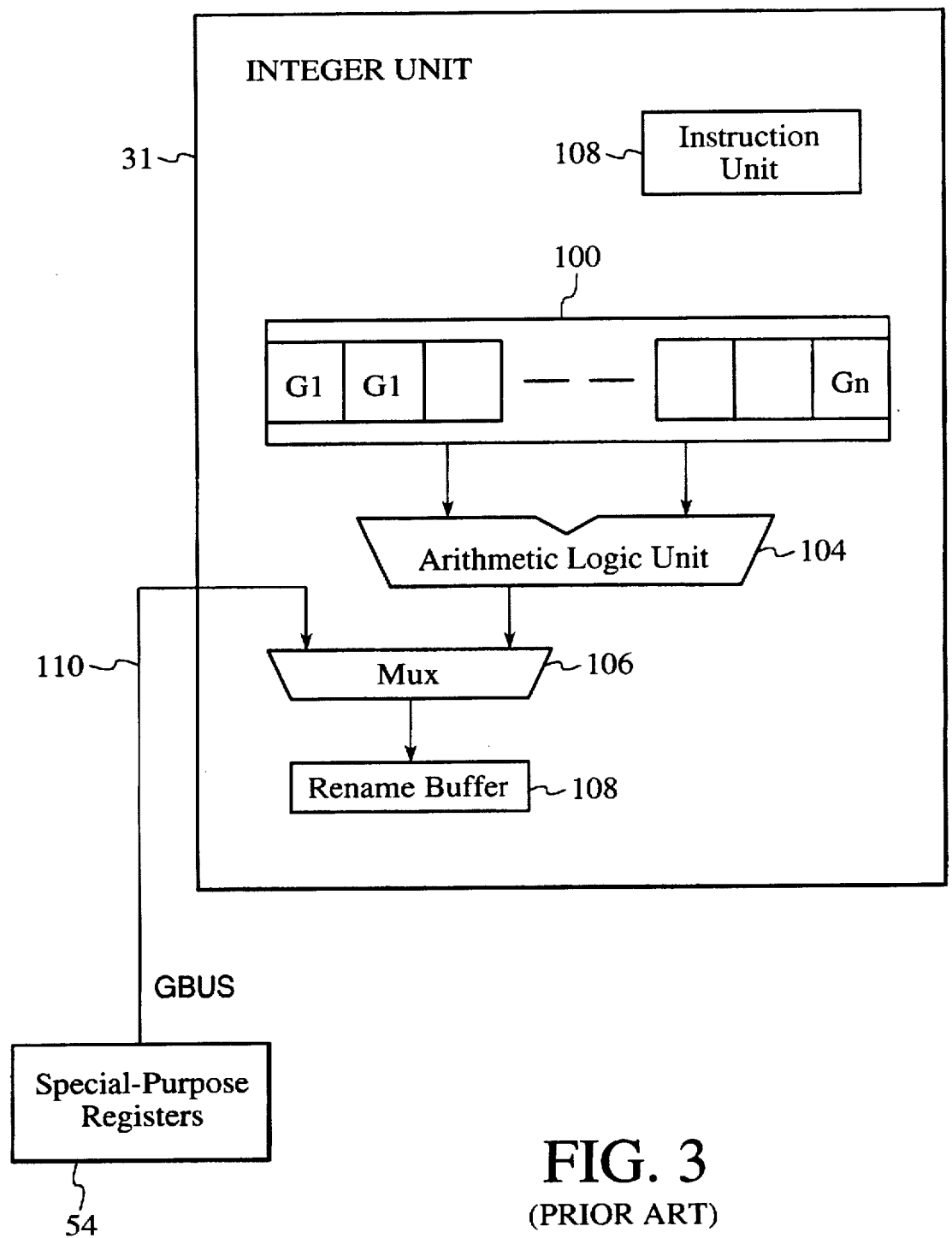
FIG. 3 is a block diagram of a prior art integer unit.

Referring now to FIG. 3, a block diagram of a prior art integer unit (IU) is shown. The IU 31 includes a plurality of general-purpose registers 100, an integer instruction unit 102, an arithmetic logic unit (ALU) 104, a multiplexer 106, and a rename buffer 108.

Host integer instructions, such as and "ADD", that are sent to the IU 31 are received by the integer instruction unit 102 where they are decoded and executed. The GPRs 100 store operands of the host integer instructions. The operands are used as inputs to the ALU 104, which performs the specified arithmetic operation on the operands. The result from the ALU 104 is input to the multiplexer 106, and the output of the multiplexer is stored in the rename buffer 108. The contents of the rename buffer may be later moved to the GPRs 100.

The SPRs 54, which store the entries of the IQ 64, are coupled to the multiplexer 106 in the IU 28 via gbus 110. When a guest instruction specifies that an operand in a GPR 100 is to be added to immediate data, the corresponding semantic routine that perform this addition must include a host instruction that moves the immediate data from the SPRs 54 into the GPRs 100.

An example semantic routine 40 that emulates the guest add instruction above may include the following instructions:

MFSPR imm., temp
ADD G1, temp
GDISC

The host instruction MFSPR (Move From SPR) is a move instruction that copies the immediate data from the SPR 54 into a temporary variable called temp, which is stored in one of the GPRs 100. The host "ADD" instruction causes the ALU 104 to add the contents of G1 with the contents of the GPR 100 storing temp. The result of the add is then stored in the rename buffer 108. As stated above, the GDISC instruction causes the processor to fetch the next semantic routine to be executed.

The extra "MFSPR" instruction in the example semantic routine 40 can significantly slow the emulation performance of the processor 10. This is due to the extra processor cycles required to execute the MFSPR instruction every time a semantic routine operates on immediate data stored in a SPR 54.

The present invention is a method and system for improving emulation performance by providing instructions that operate directly on SPR 54 contents. To more particularly illustrate the method and system in accordance with the present invention, refer now to FIG. 4 depicting a block diagram of one embodiment of such a system.

Figure 4:
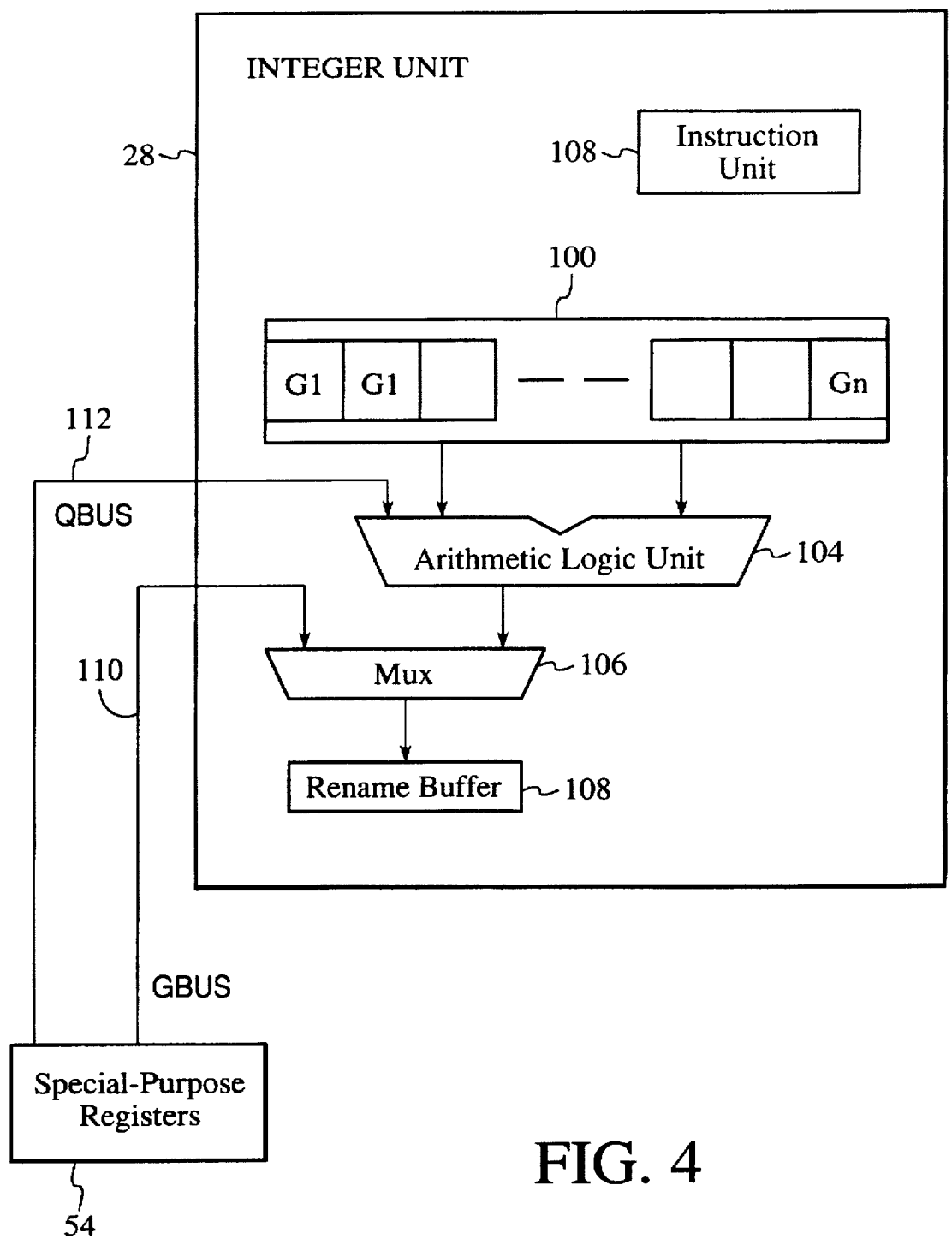
FIG. 4 is a block diagram illustrating an integer unit in accordance with the present invention.

FIG. 4 is a block diagram illustrating an integer unit (IU) 28 in accordance with the present invention. According to the present invention, a qbus 112 is provided to couple the SPRs 54 directly to the ALU 104. This allows ALU 104 operations to be performed on the contents of the SPRs 54 without first moving the contents of the SPRs 54 to the GPRs 100.

The present invention has defined a set of new host instructions to take advantage of this new feature. These new instructions are then used in semantic routines 40 that emulate guest instructions 38 having immediate data.

Referring now to FIG. 5, a table listing a set of new PPC instructions are shown that operate on immediate data that is stored in an SPR 54. The mnemonic "RT" in the instructions specifies a GPR 100 to be used as a destination, while the mnemonic "RA" specifies a GPR 100 to be used as a source.

The instruction MFGI moves immediate data from an SPR 54 and places the data in RT. The instruction ADDFGI adds immediate data from an SPR 54 to an operand in RA, and places the result in RT. The instruction SUBFGI subtracts an operand in RA from the immediate data in an SPR 54, and places the result in RT. The instruction SHIFTFGI shifts the immediate data in an SPR 54 by the shift amount specified by an operand in RA from, and places the result in RT.

Prior to these instructions, at least two host instructions were required to perform operations on immediate data in the SPRs 54. With the host instructions of the present invention, only one host instruction is required such operations. This reduces the number of instructions that the processor 10 must execute in semantic routines 40 and therefore increases emulation performance.

The set of new instructions that are possible by coupling the SPRs 54 to the ALU 104 in an IU 28 is not limited to the host instructions listed in FIG. 5. The data transfer, arithmetic, and logic instructions listed in FIG. 5 are intended only as examples.

A method and system has been disclosed that improves the emulation performance by coupling the SPRs to an integer unit's ALU to enable host instructions to directly operate on SPR contents. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving the performance of a processor that emulates a guest instruction, the guest instruction including a first and second operand, the method comprising the steps of:

(a) storing the first operand in a general purpose register and the second operand in a special-purpose register; and (b) providing an instruction that performs an operation using the first operand and the second operand without moving the second operand from the special-purpose register into the general purpose register.

2. A method as in claim 1 wherein the processor includes an emulation assist unit, wherein step (a) includes that step of:

(a1) providing the special-purpose register in the emulation assist unit.

3. A method as in claim 2 wherein the processor includes an arithmetic logical unit and a multiplexer, wherein the arithmetic logical unit is coupled between the general purpose register and the multiplexer, wherein step (a) further includes the step of:

(a2) coupling the special-purpose register to the arithmetic logical unit.

4. A method as in claim 3 wherein step (b) further includes the step of:

(b1) storing the result of the operation in a third general purpose register.

5. A method as in claim 4 wherein the operation is an arithmetic operation.

6. A method as in claim 5 wherein the operation is a data transfer operation.

7. A method as in claim 6 wherein the operation is a logic operation.

8. A method as in claim 7 wherein the processor emulates the guest instruction using an semantic routine and the instruction is an instruction within the semantic routine.

9. A processor for emulating a guest instruction, the guest instruction including a first operand and a second operand, the processor comprising:

means for storing the first operand in a general purpose register and the second operand in a special-purpose register; and instruction means that perform an operation using the first operand and the second operand without moving the second operand from the special-purpose register into the general purpose register.

10. A processor as in claim 9 wherein the processor further includes an emulation assist unit, and wherein the special-purpose register is part of the emulation assist unit.

11. A processor as in claim 10 wherein the processor further includes:

an arithmetic logical unit; and a multiplexer, wherein the arithmetic logical unit is coupled between the general purpose register and the multiplexer, and wherein the special-purpose register is coupled to the arithmetic logical unit.

12. A processor as in claim 11 wherein the instruction means further includes means for storing the result of the operation in a third general purpose register.

13. A processor as in claim 12 wherein the instruction means is an arithmetic operation.

14. A processor as in claim 13 wherein the instruction means is a data transfer operation.

15. A processor as in claim 14 wherein the instruction means is a logic operation.

16. A processor as in claim 15 wherein the processor emulates the guest instruction using an semantic routine and the instruction means is an instruction within the semantic routine.

17. A processor for emulating guest instructions, wherein a plurality of the guest instructions include immediate data, the processor comprising:

a memory for storing semantic routines at specific addresses, each of the semantic routines including a block of host instructions for emulating the function of the guest instructions;

an emulation assist unit for decoding guest instructions and dispatching a corresponding semantic routine, the emulation assist unit including, a plurality of special-purpose registers for storing a plurality of entries, wherein each of the plurality of entries includes an offset field and a data field, wherein the offset field is a pointer to the memory address the semantic routine, and the data field is the immediate data from the corresponding guest instruction;

a plurality of general-purpose registers for storing operands; and a plurality of host instructions in the semantic routines that perform operations using the immediate data and the operands in the general-purpose registers without moving the immediate data from the special-purpose registers into the general-purpose registers.

18. A processor as in claim 17 wherein the processor further includes an integer unit for executing the host instructions, the integer unit including an arithmetic logical unit and a multiplexer, wherein the arithmetic logical unit is coupled between the plurality of general-purpose registers and the multiplexer, and wherein the special-purpose registers are coupled to the arithmetic logical unit.

* * * * *

UNITED STATES PATENT AND TRADEMARK OFFICE
CERTIFICATE OF CORRECTION

PATENT NO. : 5,758,140

DATED : May 26, 1998

INVENTOR(S) : Kahle et al.

It is certified that error appears in the above-identified patent and that said Letters Patent is hereby corrected as shown below:

Column 1, Line 28: "include" should read "includes"

Column 3, Line 28: "is assist" should read 'is to assist"

Signed and Sealed this

Twenty-second Day of June, 1999

Attest:

Attesting Officer

Q. TODD DICKINSON

Acting Commissioner of Patents and Trademarks